3,335,830
METHODS AND DEVICES FOR AUTOMATIC
TRANSMISSIONS FOR VEHICLES
Gaëtan de Coye de Castelet, Billancourt, France, assignor to Regie Nationale des Usines Renault, Billancourt, France
Filed Mar. 8, 1965, Ser. No. 437,655
Claims priority, application France, Mar. 11, 1964, 967,025, Patent 1,397,316
23 Claims. (Cl. 192—.092)

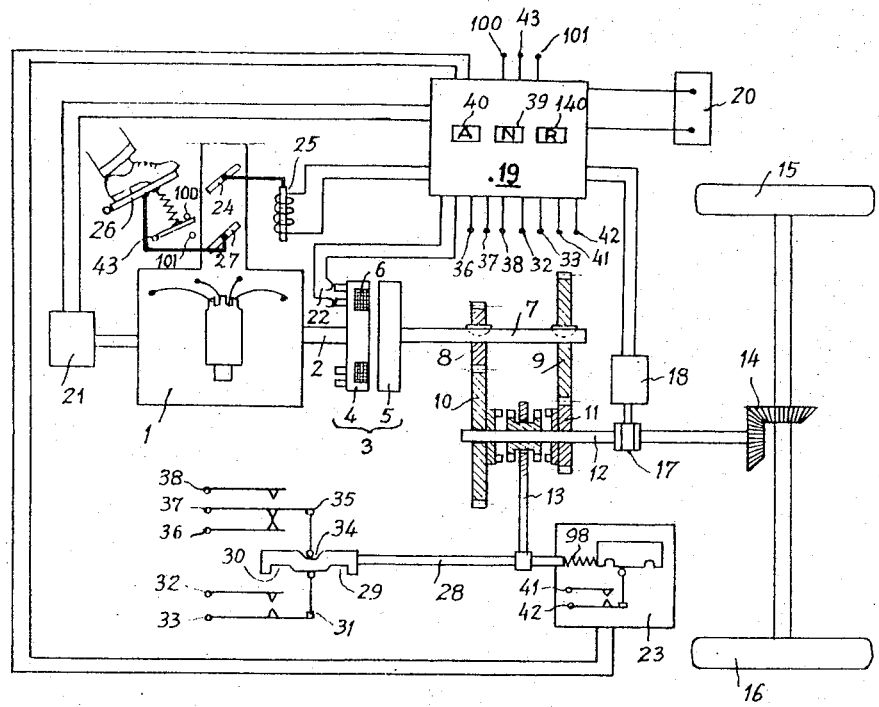
Fig_1
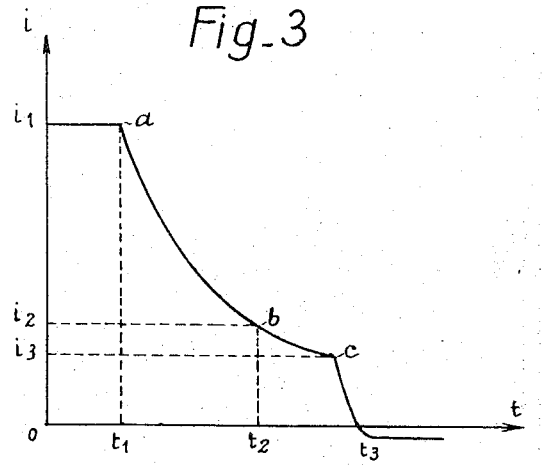
Fig_3
Inventor
Gaëtan De Coye De Castelet
By Stevens, Davis, Miller & Mosher
Attorneys United States Patent Office 3,335,830
Patented Aug. 15, 1967

It has long been known to apply to automatic or semi-automatic transmissions with non-continuous gear ratios for automobile vehicles, devices for comparing the engine speed with the speed of the output shaft of the gear-box, these devices being mechanical or electrical and permitting changes from one gear ratio to another.

The present invention relates to a method and a device for carrying it into effect, intended to obtain a rapid and smooth operation during changes of gear by an electric means of comparison of the speeds. In accordance with this method, in an automobile vehicle comprising a clutch device and a gear-box with automatic control, the speeds of the engine and that of the shaft coupled to the wheels are taken by means of tachometric devices which emit respectively electric signals, at least one of the signals being modified in accordance with the gear engaged or to be engaged, and these signals are applied to an electronic speed comparison device in order to control the acceleration or the deceleration of the engine and the choice of the moments for each of the operations necessitated by the change of gear in the gear-box; the bringing to the correct speed of the intermediate shaft or shafts of the gear-box being effected by synchronizers, the action of which is facilitated when changing down by re-engagement of the clutch at the neutral position, such as is carried out by a good driver with manual operation.

The invention will now be described with reference to the accompanying drawings given by way of example, in which:

FIG. 1 represents the general basic diagram of a transmission according to the invention by a gear-box with two forward gears controlled automatically, the gear-box being of the type with parallel shafts;

FIG. 3 is a graphic representation, as a function of time, of the progressive diminution of the current in the clutch coil at the beginning of the changes of gear.

Figure 2:
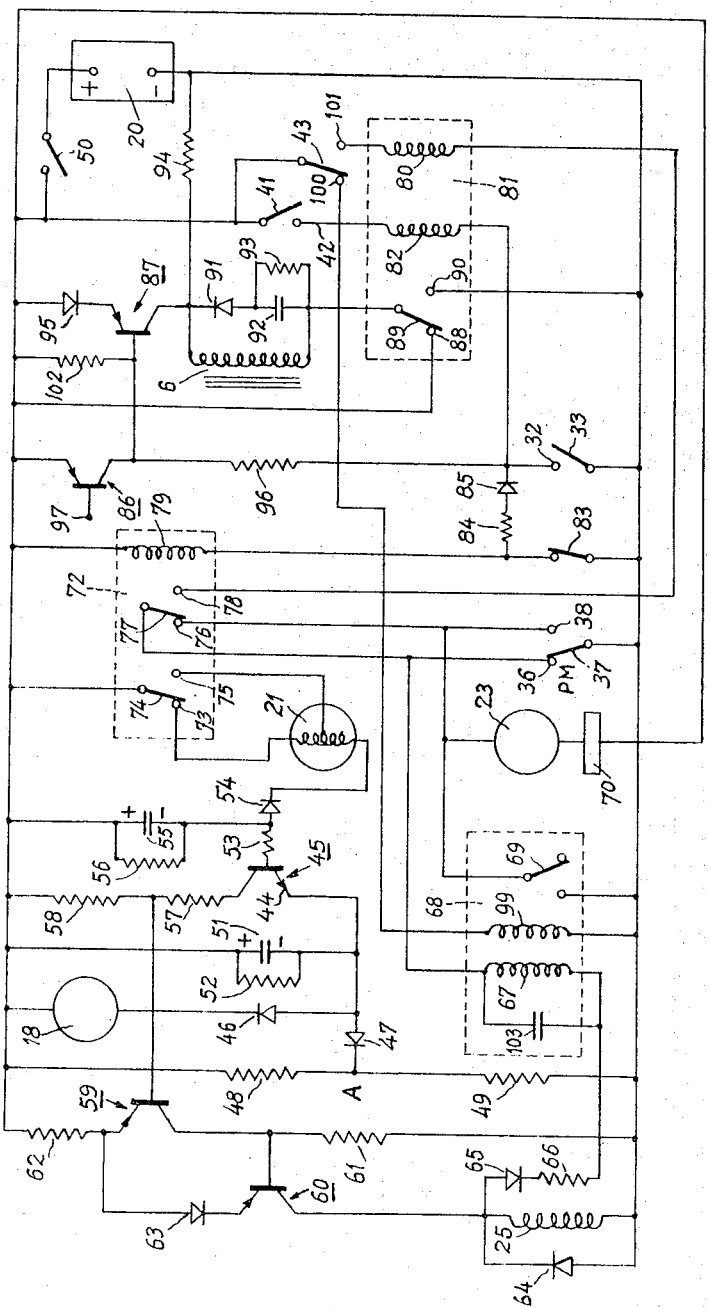
FIG. 2 is the electrical diagram of a speed-comparing device according to the invention, and in which there has also been shown a part of the supply device of the clutch of FIG. 1.

In FIG. 1, the engine of the vehicle is shown at 1, its main output shaft 2 carries an electric clutch 3 composed of a driving plate 4 containing the excitation coil 6 and a driven plate 5. The clutch may of course be of any known type, with powder, magnetic or hydraulic, with electric operation or even electrostatic. The driven plate 5 is coupled to an intermediate shaft 7 of the gear-box driving in rotation two pinions 8 and 9 engaged respectively with pinions 10 and 11, the pair of pinions 8 and 10 having the greater step-down ratio. Either of the pinions 10 and 11 can be engaged on the shaft 12 by the action of a fork 13. The engagement dogs are assisted by synchronizers of known type. The shaft 12 is coupled to the wheels 15 and 16 of the vehicle by the pair of bevel wheels 14.

The speed of the shaft 12 is ensured by a known tachometric device 18 driven by a countershaft 17. This device 18 may be a dynamo or a tachometer alternator, an impulse transmitter, etc. It is connected to the central speed comparison and control apparatus 19 supplied by the vehicle battery 20.

The speed of the vehicle engine is measured by a known tachometer device 21, coupled to the engine and sending its information to the central apparatus 19. This tachometer device 21 may be operated solely by energy derived from the ignition. The apparatus 19 supplies the electric clutch 3 through the intermediary of brushes 22 and actuates, through an elastic system 98, a shaft 28 carrying the fork 13, by a mechanism 23 which may be an electric or hydraulic motor of known type.

The inlet of the gas to the engine of the vehicle is controlled by an auxiliary butterfly-valve 24 coupled to an operating electro-magnet 25, the coil or coils of which are connected to the central apparatus 19.

The accelerator 26 of the vehicle acts on the main butterfly gas inlet valve 27 independently of the orders given by the apparatus 19 to the auxiliary butterfly-valve 24. It is however possible to have only a single butterfly-valve, at the cost of a certain mechanical complication, an elastic element being then introduced into the control following a known method of construction.

The contact blade 43, elastically coupled to the accelerator 26, touches in the foot-lifted position the contact 100 and in the foot-down position the contact 101, these contacts being connected to the terminals of the apparatus 19 carrying the same reference numbers, by connections not shown in FIG. 1. Similiarly, the terminals 32, 33, 36, 37, 38, 41, 42 of the apparatus 19 are coupled by connections not shown to contacts having the same references which will be referred to below.

The shaft 28 is provided with slots 29 and 30 controlling the blade 31 of a switch, the rest contacts 32 and 33 of which make contact when the blade 31 is in the slots, which position corresponds to the engagement of either of the pairs of pinions 8, 10, or 9, 11 of the gear-box.

The shaft 28 is provided with a further slot 34 which controls the blade 35 of a switch, the rest contacts 36 and 37 of which make contact when the blade 35 is in the slot, which position corresponds to the absence of engagement of the pinions of the gear-box, that is to say to a neutral point (position corresponding to the drawing), while in the other positions it is the working contacts 37 and 38 which are established.

The central apparatus 19 is provided with pushbuttons, one of which, 39 (marked "N" representing "Neutral") operates electrically the putting into neutral of the gear-box through the intermediary of the mechanism 23, and another of which, 40 (marked "A" representing "Forward") controls the engagement of the forward gears, either directly or through the intermediary of relays, following known technique. A push-button 140, marked "R" operates the engagement of the reverse gear.

The operation will now be described with reference to FIG. 1.

When starting, the gear-box being in neutral and the vehicle stopped with the clutch not energized, the depression of the button 40 "Forward" moves the shaft 28 towards the left-hand side of the drawing and engages the gear corresponding to the pinions 8 and 10, which is the lowest gear, by the action of the mechanism 23.

The running-up to speed of the engine under the effect of the accelerator 26 will cause the signal emitted by the member 21 to increase and will cause, during starting, the progressive energization of the clutch 3 through the intermediary of the central apparatus 19, following a well-known method.

When the speed of the vehicle is sufficiently high, the generator 18, coupled to the wheels, will cause the central apparatus 19 to prepare an order for disengaging the gears 8, 10 and to engage the pinions 9, 11 of a higher gear, which will take place by the following procedure which is a characteristic feature of the invention:

(1) The interruption of the current in the clutch 3 will be progressive during the beginning of the change from the gears 8 and 10, the duration of the progressive interruption being comprised between a few hundredths and a few tenths of a second for the usual types of touring vehicle.

(2) The order for closing the butterfly-valve 24 will only be given when the engine speed tends to become slightly higher than the "vehicle speed" (this latter expression representing the speed of the part coupled to the wheels which the engine normally drives). This will take place when the clutch no longer transmits a sufficient torque. To this end, the signal from the generator 21 will be compared to that of the generator 18 by the central apparatus 19, taking into account the step-down gear ratio of the pinions 8 and 10.

The practice of automatic transmissions with different gear ratios has in fact shown that very short reversals of the direction of the engine torque are noticeable by the passengers in the vehicle. The smoothest operation for the changes of gear is obtained when the speed of the engine is not at any moment less than the "vehicle speed"; it will even preferably be slightly higher.

(3) All current will be cut-off from the clutch 3 when the dog coupling the pinion 10 to the shaft 12 is released, or preferably slightly before. The operation of the fork 13 not being instantaneous, this condition can be obtained.

(4) The mechanism 23 now engages the pair of pinions 9 and 11 through the intermediary of the fork 13 while the speed of the engine 1 continues to fall with the butterfly-valve 24 closed.

(5) When the dog-operating contacts 32 and 33 of the pinions 9 and 11 close, current is applied to the clutch, but without this operation being associated with the opening of the butterfly-valve 24. At the beginning of the operation, the engine speed will be most frequently higher than the vehicle speed, since the deceleration of the engine is less rapid than the change of gear, and the two speeds tend to approach each other by the action of the torque transmitted by the clutch 3.

(6) When the engine speed is only slightly higher than the vehicle speed, again by comparison of the speeds of the generators 18 and 21, taking into account the gear engaged, the central apparatus 19 gives the order for re-opening, progressively or not, of the butterfly-valve 24. The operation of changing to a higher gear is complete.

If for any reason whatever (operation of the main butterfly-valve 27 or increase of the gradient climbed by the vehicle) the speed of the vehicle falls under a determined value, the generator 18 will cause the central apparatus 19 to prepare the order for changing the pinions 9 and 11 and the engagement of the pinions 8 and 10 corresponding to a lower gear.

During the whole operation of changing-down, the speed of the engine is controlled, as soon as the order for this is given, by the comparison of the speeds of the engine and wheels, taking into account the gear to be engaged, contrary to the procedure for changing-up, in which, up to the disengagement of the lowest gear ratio, the comparison is effected by taking into account the pair of pinions which are still engaged.

The succession of the operations which are a characteristic feature of the present invention can therefore be summarized as follows:

(1) The interruption of current to the clutch is gradual while the operation of disengagement of the pinions 9 and 11 is begun.

(2) The auxiliary butterfly-valve 24 remains open, that is to say as soon as the clutch 3 no longer transmits a sufficient torque, the engine speed increases.

(3) The increase of speed of the engine 1 will only be limited if it substantially exceeds the vehicle speed, taking into account the new gear ratio to be engaged.

(4) As soon as the fork 13 has reached the neutral position, by the action of the servo-mechanism 23, the current is restored to the clutch 3 in order to bring the speed of the shaft 7 closer to the speed of the engine 1, which is itself dependent on the speed of the wheels under the action of the speed comparing device.

(5) The servo-mechanism 23 will receive an order to stop at the neutral point if at that moment the engine speed has not become at least equal to the vehicle speed for the new gear ratio to be engaged.

(6) As soon as the neutral is left, the current to the clutch 3 is interrupted.

(7) The mechanism 23 actuates the synchronizer of the pair of pinions 9 and 11 through the intermediary of the fork 13, and the engagement of the dogs is effected without difficulty.

(8) This engagement closing the contacts 32 and 33, the central apparatus 19 sends current into the clutch, while the engine is re-accelerated in dependence on the speed-comparison mechanism.

The contacts 43, 100 and 43, 101 connected to the accelerator pedal serve to prevent the application of current and stopping at the neutral position when the accelerator is raised.

FIG. 2 is the electrical diagram of a speed-comparing device according to the invention, given by way of example of construction. In the right-hand part of this figure, there has also been shown a part of the device for supplying the clutch of FIG. 1. In order to simplify the explanation of its operation, an analogue device for comparing speeds has been chosen, the generator 18, coupled to the wheels and generator 21 coupled to the engine, both delivering a voltage which increases with their speed. These will be for example tachometer alternators.

The emitter 44 of an NPN transistor 45 is connected through a diode rectifier 46 to the generator 18 coupled to the wheels, the conductive direction of the diode being towards the generator. This emitter 44 is also connected to the anode of a diode 47, the cathode of this diode being connected to the point A, the potential of which is fixed by the ratio of the resistances 48 and 49 constituting a voltage divider between the positive and negative poles of the vehicle battery 20 through the contact key 50. The potential of the emitter 44 is smoothed by a reservoir condenser 51 with which is associated a discharge resistance 52.

The base of the transistor 45 is connected through a limiter resistance 53 and a diode 54 to one extremity of the winding of the generator 21 coupled to the engine, the cathode of the diode 54 being connected to the generator. Between the diode 54 and the resistance 52 is connected the negative plate of a smoothing condenser 55 with which is associated a discharge resistance 56. The positive plates of the condensers 51 and 55 together with the generator 18 are connected to the positive pole of the battery through the key 50.

The collector of the transistor 45 is also connected to the positive pole of the battery through two resistances 57 and 58, mounted in series and having their common point connected to the base of a PNP transistor 59 constituting with the PNP transistor 60 a mono-stable flip-flop. To this end, the collector of the transistor 59 is connected directly to the base of the transistor 60 and to the negative pole of the battery through the coupling resistance 61. The emitters of the transistors 59 and 60 have in common towards the positive pole, the resistance 62, the diode 63 being further inserted in the emitter circuit of the transistor 60 in order to compensate for the collector-emitter waste voltage of the transistor 59 when the latter is conductive.

The coil of the decelerator 25 connects the collector of the transistor 60 to the negative pole, a recuperation diode 64 being connected in parallel to the coil. The collector of the transistor 60 also supplies the coil 67 of a relay 68 through a diode 65 in the conductive direction and a resistance 66. A condenser 103 is connected in parallel with the coil 67 which it delays both for charging (by means of the resistance 66) and for discharging.

The return of the coil 67 to the negative pole of the battery is mainly effected through the contacts 36, 37 which are closed in the neutral position.

The relay 68 is provided with a working contact 69 providing the return to the negative pole of the control device 23 for the fork 13 of the gear-box. This control device is for example an electric motor of which the working control and the reversal of direction are ensured by a casing 70 for relays or semi-conductors, under the control of the push-buttons 39 and 40 (see FIG. 1) and of the generator 18, coupled to the wheels, in accordance with known technique. The earth return of the motor 23 can also be effected by the contacts 37 and 38 which are closed when the gear-box is not in the neutral position.

The return to the positive pole of the battery of the windings of the generator 21 coupled to the engine can be effected either at rest by a relay 72 when the blade 74 touches the rest contact 73 connected to the extremity of the winding of the generator 21, or on the contrary at work, when the blade 74 touches the working contact 75 connected to the intermediate tapping of the generator 21. The ratio of the voltages thus delivered by the generator 21 is approximately the same as the step-down gear ratio of the pinions 8, 10 and 9, 11, the lowest voltage being supplied on the lower gear ratio.

This relay 72 has a second blade 77 connected to the contact 36 which touches the blade 37 when the gear-box is in the neutral position. The rest contact 76 is connected to the contact 38 which provides a return to the negative pole for the control device 23 when the gear-box is not in neutral. The working contact 78 is connected through the coil 80 to the contact 33, 101 established as soon as the accelerator of the vehicle is depressed, the blade 43 being returned to the key 50.

When the foot is lifted from the accelerator, the blade 43 touches the rest contact 100 which is connected to a coil 99 of the relay 68, the extremity of which is returned to the negative pole of the battery. The return connection of the motor 23 will thus always be ensured in the foot-lifted position.

The relay 81 has a second coil 82 connected on one side to the key 50 through the contacts 41 and 42, closed when the control mechanism 23 has completed its travel while compressing the spring 98 (see FIG. 1) and applying one of the synchronizers of the gear-box, and on the other side to the contacts 32 and 33, closed when the fork of the gear-box has completed its movement and when the engagement of a gear has been made. The contact 33 is connected to the negative pole of the battery. The coil 79 of the relay 72 is connected on the one side to the key 50 and on the other to the negative pole through the contact 83, closed when the order for engagement or for return to the lower gear is given, in particular by the action of a known mechanism operated by the generator 18 coupled to the wheels of the vehicle, or by the push-button 40 (see FIG. 1).

Between the contact 83 and the contact 32 there are also arranged in series a resistance 84 and a diode 85, in the conductive direction. The resistance 84 has a value such as that it can maintain the relay 72 at work when the contacts 32, 33 are closed but it cannot call the said relay. The diode 85 prevents the reverse action by the contact 83 for the coil 82.

There has also been shown in FIG. 2 the portion of the known type of supply for the clutch 6 which is necessary for understanding the general operation. This supply comprises two PNP transistors 86 and 87, the transistor 87 being a power transistor in the collector circuit of which is placed the coil 6 of the clutch 3 which returns by the blade 89 of the relay 81, either through the rest contact 88 to the key 50, or to the negative pole of the battery through the working contact 90. In parallel with the coil 6 is arranged a limiter circuit composed of a diode 91 in series with a condenser 92 and a resistance 93, the cathode of the diode 91 being connected to the collector of the transistor 87, the said collector being also connected to the negative pole of the battery through a resistance 94 which ensures the passage of a de-magnetizing current in the coil 6 when the relay 81 is at rest, during the period of gear-changing.

The emitter of the transistor 87 is connected to the cathode of a diode 95, the anode of which is connected to the key 50, while the base of the transistor 87 is connected, on the one hand to the key 50 through a resistance 102, and on the other hand to the collector of the transistor 86, this collector having its return to the negative pole through the coupling resistance 96 and the contact 32, 33. The emitter of the transistor 86 goes to the key 50, while to its base 97 are applied signals prepared in known manner from the speed of the engine 1 and permitting a supply to the clutch 6 which increases with the speed of the engine.

The operation of the device shown in FIG. 2 will now be described with reference to FIGS. 1, 2 and 3.

It is assumed that the pair of pinions 8 and 10 (the ratio of which gives the lowest gear) is engaged by the action of the mechanism 23, with the vehicle stopped and the engine running at idling speed. The supply of the coil 6, in relation to the speed of the engine, is effected in known manner as follows:

The end of travel contacts 32, 33 of the fork of the gear-box being closed, as are also the contacts 41, 42 of the mechanism 23, the relay 81 is brought into operation by its coil 82 closing the contact 89, 90, which ensures the excitation of the coil 6 by the battery 20 through the transistor 87, the diode 95 and the key 50. The sending of a positive wave into the base 97 of the transistor 86 blocks the latter and causes the current to circulate in 87 and 6, the mean value of which will depend on the wave-forms applied to the base 97 (in accordance with known techniques) in relation to the speed of the engine 1.

The contact 83 is closed since there has been a manual or automatic order from the first gear, that is to say the relay 72 is in operation which results in the closure of the contacts 74 and 75, a part only of the windings of the generator 21 being in service.

As long as the average voltage of the generator 21, coupled to the engine, is less than that of the point A, taking into account the threshold of the diodes 47 and 54 and the function base-emitter of 45, this latter transistor will be conductive, that is to say 59 will also be conductive while 60 will not, the coil 25 for this reason not being energized. The auxiliary butterfly-valve 24 will remain open and the starting-up of the vehicle will be possible by the action of the accelerator 26, in spite of the face that during the course of starting (as result of slip of the clutch) the engine speed is definitely higher than the vehicle speed.

When the potential of the generator 18 is higher than that of the point A with respect to the common positive, the potential of the emitter 44 will vary as that of the generator 18. It is desirable that the direct waste potential of the diode 46 is slightly greater than that of the combination of the diode 54 and the base-emitter junction of 45.

If at a given moment the voltage of the generator 21 become slightly greater than that of the generator 18, the transistor 45 would cease to be conductive and the coil 25 would be energized, closing the butterfly-valve 24.

The coupling being obtained, the speed of the engine 1 will be practically equal to that of the vehicle to within the gear ratio engaged, and the butterfly valve 24 will remain open.

When the central apparatus 19 prepares, as a function of the speed of the vehicle and of the load on the engine in accordance with known methods, an order for the change to the high gear ratio of the pinions 9 and 11, the contact 83 will be open but the relay 72 will only come back to rest when the end-of-travel contacts 32, 33 of the gear-box fork 13 are opened. From the beginning of the operation of the mechanism 23 (extending the fork-control elastic element 98), the contacts 41, 42 will open, causing the relay 81 to pass to rest and closing the contacts 88, 89 so that the winding 6 is then looped on itself through the transistor 87 and the diode 95.

FIG. 3 is a representation of the variation of the current $i$ in the coil 6 as a function of the time $t$ starting from the rest time $t_1$ of the relay 81, the current then decreasing exponentially from the value $i_1$ (point $a$) to the value $i_3$ (point $c$).

When for a current $i_2$ (point $b$) at the instant $r_2$ variable with the position of the accelerator 26, the clutch 3 no longer transmits a sufficient torque, it will begin to slip and the engine speed will increase, thus causing the closure of the auxiliary butterfly-valve 24 to limit the speed of the engine.

After a sufficient travel of the fork 28, the end-of-travel contacts 32, 33 will open, rendering the transistor 87 non-conductive (instant $t_2$, current $i_3$, point $c$ of FIG. 3). The current in the coil 6 will then decrease rapidly only finding a closure on the diode 91, the condenser 92 and the resistance 93. The resistance 94 then causes a slight reverse current to flow in the coil 6.

There has thus been obtained a progressive de-clutching, which is however complete, with control of the engine speed on the ratio 9, 10.

The opening of the end-of-travel contacts 32, 33 of the fork at the instant $t_3$, brings to rest the relay 72, closing the contacts 73 and 74 and putting into service the whole of the windings of the generator 21, so that the comparison of the speed is made from that moment, on the basis of the new gear ratio to be engaged.

No stopping of the mechanism 23 has been provided in the neutral position, the contacts 76, 77 connecting together the contacts 36 and 37.

The engagement of the pinions 9 and 11 of higher gear ratio results first of all in the closure of 41 and 42 and then 32 and 33, which leaves 72 at rest, puts 81 into operation and re-supplies the clutch 6. The engine speed which had slowly fallen during the change of gear, now decreases rapidly due to the effect of the coupling of the clutch. As soon as the voltage of the generator 21 coupled to the engine becomes of the same order as that of the generator 48 coupled to the wheels, the coil 25 is de-energized and the butterfly-valve 24 is re-opened: the engagement of the clutch is complete.

The return to a lower gear ratio, carried out either manually or automatically, is initiated by the closure of the contact 83 followed by the opening of 41, 42 and then the opening of 32, 33. The relay 72 having been operated from the time of the order, the comparison of the speeds is effected on the basis of the lowest gear ratio, before even the contacts 32 and 33 at the end of travel of the fork are opened. With this exception, the process of de-clutching is identical with that of changing-up through the gears. The engine 1 will be accelerated and not slowed-down from the point $b$ of FIG. 3 onwards if the accelerator 26 is depressed.

Before passing to the neutral position, the return of the motor 23 to the negative pole of the battery is effected by the contacts 37, 38. At the neutral position, these are opened in order to close the contacts 37, 36. The motor 23 and the fork 13 thus stop at the neutral point, the contacts 76, 77 and 69 being opened.

The relay 81 then comes into operation by the coil 80, since the contacts 43, 101; 78, 77; 36, 37 are closed, energizing the coil 6. The speed of the shaft 7 thus increases since it is coupled to the engine.

As soon as the comparison of the speeds has given an order for closure of the butterfly-valve 24, that is to say for energizing the coil 25, the coil 67 actuates the relay 68 after a certain delay due to the time delay of the condenser 103. The contact 69 is closed and the motor 23 starts-up again. The time delay provides a minimum time for running the shaft 7 up to speed.

The re-engagement of the clutch is identical with that previously described.

During changing-down through the gears with the foot lifted, the running-up to speed of the engine cannot take place. The closure of the contacts 43, 100 supplies the coil 99 and provides a permanent return to the negative pole for the motor 23, which thus will not stop in the neutral position. Also, there will not be any re-engagement of the clutch in the neutral position.

It is desirable to include in the scope of the present invention the deceleration or acceleration of the engine by known means other than the auxiliary butterfly-valve 24 described in FIG. 2, in particular by variation of the advance of the ignition, in accordance with U.S. patent application Ser. No. 349,940, filed on Mar. 6, 1964 by the same applicant under the title "A method of and apparatus for obtaining the deceleration of the engine of an automobile vehicle provided with an automatic gear-box, by variation of the advance." In the case of the example of construction shown in FIG. 2 of the accompanying drawings, the collector of the transistor 45 should, for the application of the previous invention which has just been referred to, be connected to a sensitive point of the circuits.

What I claim is:

1. A vehicle comprising an engine having a drive shaft; a mechanical gear box having an input shaft, an output shaft, a plurality of pairs of pinions mounted on said shafts and a sliding fork adapted to selectively operatively engage said pinions to drivingly engage said input shaft and output shaft at different speed ratios; an electric clutch adapted to drivingly engage said drive shaft and said input shaft; and wheels mounted on said output shaft; wherein the improvement comprises a tachometric member arranged on said drive shaft and said output shaft and adapted to emit a signal in accordance with their respective speeds; a speed comparison device responsive to the signals received from said tachometric devices and adapted to emit corresponding output signals; speed control means responsive to said output signals for controlling the speed of said engine; and clutch control means responsive to said output signals for controlling said clutch.

2. The apparatus of claim 1, further comprising means for detecting the engaged positions of said fork and adapted to modify the signals emitted by said tachometric members accordingly.

3. The apparatus of claim 1, further comprising means for detecting the neutral position of the gear-box and causing the re-engagement of the clutch at the neutral position so as to increase the speed of said input shaft during changing-down operations.

4. The apparatus of claim 1, wherein said output signals are such that said clutch control means progressively reduces the torque transmitted by the clutch at the beginning of changes of gear.

5. The apparatus of claim 1, wherein during changes to a higher gear ratio, said speed comparison device compares speeds on the basis of the gear ratio engaged as long as they remain engaged, and thereafter on the basis of the gear ratio to be engaged.

6. The apparatus of claim 1, wherein during changes to a lower gear ratio, said speed comparison device compares speeds on the basis of the gear ratio to be engaged.

7. The apparatus of claim 1, further comprising fork control means responsive to said output signals for controlling the movement of said sliding fork.

8. The apparatus of claim 7, wherein during changes to a lower gear ratio, said fork stops in the neutral position and only moves after a certain delay starting from the equalization of the speeds of the engine and said output shaft, taking in account the gear ratio to be engaged.

9. The apparatus of claim 7, wherein no stopping of said fork is provided in the neutral position for changes to a higher gear ratio.

10. The apparatus of claim 1, wherein said speed comparison device does not compare speeds below a certain vehicle speed in order to permit starting up.

11. The apparatus of claim 1, wherein during gear changes with the accelerator depressed, the speed of the engine is never less than the speed of said output shaft, taking into account the proper gear ratio.

12. The apparatus of claim 7, wherein at least one of said tachometric elements has regulating elements which permit a variation of the signals emitted in accordance with a staggering equal to that of the pairs of pinions with respect to each other, and wherein said speed comparison device is so formed that, upon passage to a less stepped-down speed, it acts on elements which affect the choice, for the signal variation tachometric element, of the signal corresponding to the pair of pinions to be abandoned, while after passage to dead center as well as upon passage to a more stepped-down speed, the signal selected is that corresponding to the pair of pinions to be engaged.

13. The apparatus of claim 1, in which at least one of said tachometric members is a tachometric generator comprising windings with input and output terminals and an intermediate terminal, so that the voltages delivered by the output terminal and the intermediate terminal are in the same ratio with respect to each other as that of the ratio of the pinions, the lowest voltage being supplied on the most stepped-down ratio.

14. A device in accordance with claim 13, further comprising a relay, an electrical contact for actuating said relay and a holding resistance, at least one of the said terminals being connected through the intermediary of said relay when an order is given for change to a lower gear, and wherein during the change to the lower gear said relay remains operative by said resistance as long as the end of travel of said fork corresponding to the gear ratio is to be discontinued has not be abandoned.

15. A device in accordance with claim 12, further comprising a generator operatively coupled to said engine; a transistor; a plurality of non-return diodes; the rectified voltage derived from said generator being applied to the base of said transistor the emitter of which is coupled to said generator and to a fixed voltage through the intermediary of said diodes so that the said transistor is conductive as long as the speed of the engine is less than a certain value, which in turn depends on the speed of the vehicle beyond an upper limit of the latter; and an amplifier connected to the collector of said transistor and adapted to control the speed of the engine.

16. A device in accordance with claim 15, further comprising a carburetor having au auxiliary butterfly valve to control the supply of gasoline to said engine, and an electromagnet operatively connected to said carburetor, said amplifier being a mono-stable flip-flop type comprising an input transistor and an output transistor, the coil of said electro-magnet being placed in the collector circuit of said input transistor.

17. A device in accordance with claim 15, further comprising a vehicle battery, a relay having a coil and a delay system comprising a resistance and a condenser, said amplifier supplying said coil through said delay system, the return to said battery of the said coil only being possible in the neutral position of said fork, said relay having a working contact which is closed in the neutral position with a certain delay after equality of the speeds has been obtained, taking into account the gear ratio to be engaged.

18. A device in accordance with claim 12, further comprising a relay having a working contact, said fork control means comprising an electric motor the supply of which is interrupted when passing through neutral during changes to a lower gear ratio by said relay; and a contact controlled by the order of engagement and adapted to excite the coil of said relay, the said supply being subsequently restored by said working contact of the relay after equalization of the speeds and taking into account the gear ratio to be engaged.

19. A device in accordance with claim 12, further comprising a vehicle battery, the supply of said clutch from the vehicle battery comprising in series, a contact key, a diode, a first transistor, the coil of the clutch and the limiter circuits associated therewith, and the blade of a relay with two coils; and further comprising a second transistor to which the base of said first transistor is directly connected; a coupling resistance, the base of said first transistor being connected to the other extremity of the battery through said coupling resistance and an end-of-travel contact of the fork of the gear-box; the emitter of the second transistor being connected to the contact key; signals being supplied to the base of said second transistor in relation to the speed of the engine in order to obtain a current which progressively increases with the speed of the engine of the vehicle in the clutch coil; said second transistor being non-conductive in the engaged position of the clutch.

20. A device in accordance with claim 19, wherein the circuit of the first coil of said relay comprises a pair of contacts closed only at the extremities of the travel of said fork, so that, at the beginning of changes of gear ratio, the opening of one of said contacts brings the relay to rest while causing the current in the clutch coil to decrease exponentially, said first transistor remaining conductive by the still maintained closure of the other of said contacts.

21. A device in accordance with claim 20, wherein the relay is put into operation at the neutral position by its second coil when the "accelerator down" conditions are fulfilled when changing to a lower gear and in the neutral position.

22. A device in accordance with claim 20, wherein the sending of current into the clutch coil and the stopping in the neutral position are eliminated in the foot-up position of the accelerator by contacts adapted to be closed by actuation of said accelertaor and acting on said relays.

23. In a vehicle having a clutch means adapted to operatively connect an engine to a transmission system, a method for increasing or decreasing the speed of the engine while effecting clutching or unclutching in order to obtain a change in the transmission ratio, comprising the steps of supplying families of electric signals in response to the speed of said vehicle and said engine, modifying said signals in accordance with the transmission ratio, comparing said signals, and emitting corresponding output signals to control the speed and clutching of the engine.

References Cited

UNITED STATES PATENTS 3,182,778  5/1965  Droschel _____ 192—.092

FOREIGN PATENTS 1,096,319  1/1955  France.

FRED C. MATTERN, Jr., *Primary Examiner.*

C. J. HUSAR, *Assistant Examiner.*